(12) United States Patent
Lavallee et al.

(10) Patent No.: US 6,589,429 B2
(45) Date of Patent: Jul. 8, 2003

(54) METHOD OF TREATING INDUSTRIAL WASTEWATER

(75) Inventors: Henri-Claude Lavallee, Edmonton (CA); Daniel Gagnon, Edmonton (CA); Sylvain Robert, Edmonton (CA)

(73) Assignee: Sustainable Forest Management Network, Edmonton (CA)

( * ) Notice: Subject to any disclaimer, the term of this patent is extended or adjusted under 35 U.S.C. 154(b) by 64 days.

(21) Appl. No.: 09/949,619

(22) Filed: Sep. 12, 2001

(65) Prior Publication Data

US 2002/0096478 A1 Jul. 25, 2002

(30) Foreign Application Priority Data

Nov. 16, 2000 (CA) .............................................. 2326540

(51) Int. Cl.[7] .................................................. C02F 1/00
(52) U.S. Cl. ....................... 210/739; 210/742; 210/743; 210/749
(58) Field of Search ................................ 210/739, 742, 210/743, 749, 928

(56) References Cited

U.S. PATENT DOCUMENTS

| 4,261,819 A | 4/1981 | Winter |
| 4,289,531 A | 9/1981 | Lechavelier et al. |
| 4,355,137 A | 10/1982 | Winter |

FOREIGN PATENT DOCUMENTS

| CA | 1116765 | 1/1982 |
| CA | 1186967 | 5/1985 |
| CA | 2138274 | 3/1993 |
| FR | 2588850 | 4/1987 |
| WO | WO 92/00919 | 1/1992 |

OTHER PUBLICATIONS

Himmelblau, David M.; "Process Analysis by Statistical Methods" Book published by John Wiley & Sons, Inc., 1970.

Primary Examiner—Betsey Morrison Hoey
(74) Attorney, Agent, or Firm—Bennett Jones LLP

(57) ABSTRACT

A method of treating industrial wastewater using casein includes an optimization step whereby treatment operating variable are optimized through statistical methods on experimental designs.

3 Claims, 1 Drawing Sheet

METHOD OF TREATING INDUSTRIAL WASTEWATER

This application claims the priority benefit of Canadian Patent Application No. 2,326,540 filed on Nov. 16, 2000 as file no. 37304.2 and entitled Method of Treating Industrial Wastewater.

FIELD OF THE INVENTION

The present invention relates to methods of treating industrial wastewater comprising pulp and paper mill effluents involving physico-chemical precipitation.

BACKGROUND OF THE INVENTION

Large amounts of water are used in the various stages of the papermaking process in a pulp and paper mill ("PPM"). The papermaking process includes several steps, i.e., bark removal, pulping, bleaching, etc. Each of these steps uses a great deal of water. While significant improvements have been made in conserving and reusing water in the papermaking process, it is still necessary to discharge a certain amount of wastewater from the system.

The wastewater from a pulp mill is contaminated with lignins, lignin degradation products, cellulose and holocellulose degradation products and humic acids. These contaminants make the effluent stream dark colored and are often referred to as color bodies. Since pulp mill plants produce large quantities of this densely-colored effluent, the discharge of this effluent into adjacent streams and bodies of water can cause an objectionable discoloration and pollution of the water.

The effluent stream leaving the pulp plant usually empties into a settling basin. Various processes have been proposed for the decolorization of the effluent at this stage. Conventional effluent treatment processes, such as the precipitation of the suspended solids with lime, polyelectrolyte polymers or inorganic metallic salts are effective in removing some color from such effluent. However, polyelectrolyte polymers are prohibitively expensive for treating the quantities of effluents generated by commercial-size pulp and paper plants. Furthermore, inorganic metallic salts produce a great deal of sludge when used at appropriate levels to treat this quantity of water. This sludge must be removed and disposed of at a cost which renders these metallic salts impractical.

Therefore, there is a need in the art for an efficient process of removing colour bodies and organic pollutants from a PPM effluent, which process is not prohibitively expensive and which may successfully remove such colour bodies and organic pollutants at least as effectively as the prior art methods.

SUMMARY OF THE INVENTION

The present invention is directed to methods of treating a wastewater stream to remove contaminants. The invention is described herein with reference to the effluent from a PPM and in particular, from a chemical thermomechanical pulping ("CTMP") process. However, it is to be understood that the present invention may be applied to other wastewater streams where efficient contaminant removal is desired. For example, the present invention may be applied to other PPM effluents such as BCTMP, DIP, Kraft, SCMP, TMP, fine papers, roofing felt, sulphite and other industrial wastewater streams.

Therefore, in one aspect, the invention comprises a method of removing contaminants from a wastewater stream comprising the steps of:

(a) obtaining a plurality of wastewater samples from the wastewater stream;

(b) choosing a plurality of operating variables, at least one of which is concentration of a polymer comprising casein;

(c) operating a plurality of trials to assess treatment efficiency wherein each trial is operated using a different combination of operating variables from other trials;

(d) determining an optimum value of each operating variables to achieve optimum contaminant removal from the wastewater stream; and (e) treating the wastewater stream with a polymer comprising casein utilizing the optimized values determined in step (d).

In one embodiment, the wastewater stream is the effluent stream of a wood pulp bleaching process.

In one embodiment, the determination of optimum values is carried by a statistical analysis. The method of statistical analysis may be the Box-Wilson method or Central Composite Design ("CCD") method.

In a preferred embodiment, at least 5 operating variables are chosen and in a particularly preferred embodiment, the at least 5 operating variables are the following:

(a) concentration of the polymer comprising casein;
(b) pH;
(c) temperature;
(d) hydraulic retention time; and
(e) degree of agitation.

Of course, in alternative embodiments, the operating variables may be limited to one or more operating variables which may or may not include those specific variables listed above.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF THE INVENTION

Figure 1:
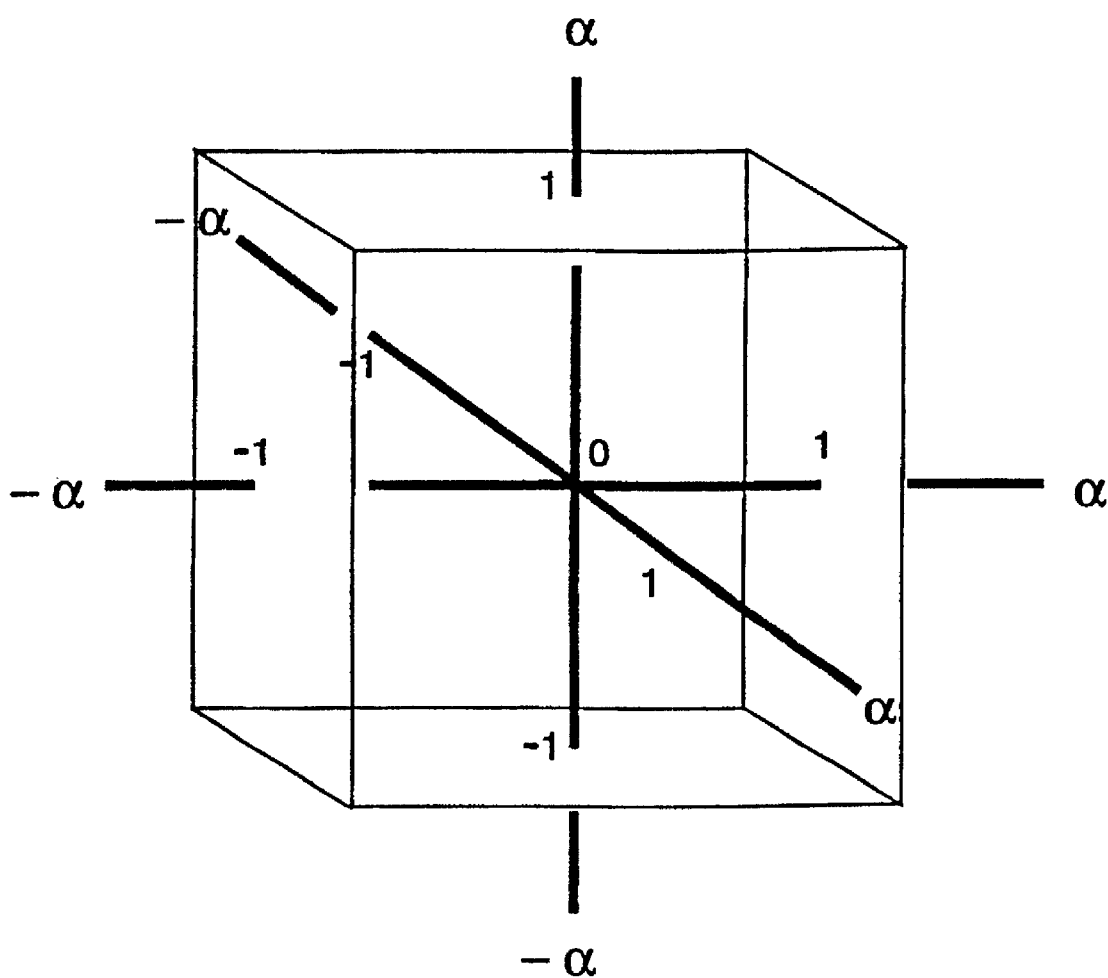
FIG. 1 shows a graphical representation of a 3 factor-5 level Central Composite Design.

The present invention provides for methods of removing contaminants from a wastewater stream. When describing the present invention, the following terms have the following meanings, unless indicated otherwise. All terms not defined herein have their common art-recognized meanings.

The foregoing description is of one embodiment of the claimed invention. The limitations described herein are not to be interpreted as claim limitations of the invention unless expressly stated to be the case.

The method of the present invention uses an organic polymer to remove contaminants from a wastewater stream in a physico-chemical process. Treatment processes for pulp mill effluents are well known in the art. The following references provide a general review of such processes, contents of which are incorporated herein by reference:

1. GAGNON, D. "Nouvelle approche de traitement des eaux usées papetières." Thèse présentée à l'Université du Québec à Trois-Rivières comme exigence partielle du doctorat en Génie Papetier. 575 pp. (2000)
2. RUSH, R. J. & SHANNON, E. E. "Analyse des techniques de décoloration dans l'industrie des pâtes et papiers." Service de protection de l'environnement. Environnement Canada. Rapport EPS 3-WP-76-5 F. Avril 1976. 78 pp. (1976).
3. SASTRY, C. A. <<Colour removal from pulp and paper mill wastewaters.>> Indian J. Envir. Protection 6(2): 105–113. (1986).
4. SCHMIDT, S. R. & LAUNSBY, R. G. "Understanding industrial designed experiments." Air Academy Press, Colorado Springs, Colo., USA. 520 pp.+Annexes. (1992).
5. SRINIVASAN, D. <<Pulp and paper effluent management.>> Water Environment Research 66(4): 417–432. (1994)

In the present invention, the effluent is mixed with casein, which is a naturally occurring biopolymer. Casein acts to flocculate the contaminants suspended or dissolved in the effluent and will substantially remove such contaminants when precipitated out of solution. The precipitate may be removed by conventional methods such as by sedimentation, filtration, flotation or the like.

Casein is a protein found in bovine milk and is unique to milk. It is a conjugated protein belonging to the group of phosphoproteins, i.e., phospho-glucoproteins, occurring in milk and cheese. Casein is obtained from milk by removing the cream and acidifying the skimmed milk, which causes casein to precipitate.

Casein is a white, amorphous powder or granules without odour or taste. It is very sparingly soluble in water and in nonpolar organic solvents and is soluble in aqueous solutions of alkalies, levorotaroty. It is present in bovine milk as neutral calcium caseinate.

Casein may be obtained or used in many different forms, as is well known in the art. Casein can have different degrees of purity, e.g., sodium caseinate, cow milk, industrial reject. Casein in any form or purity may be used in the present invention. In a preferred embodiment, sodium caseinate is the form of casein used.

Sodium caseinate is a tasteless, odorless, water-soluble, white powder. Industrial or commercial caseinate can be produced on various forms. Sodium caseinate is a modified protein extracted from pure milk. Sodium caseinate may be formed by dissolving casein in sodium hydroxide and then evaporating the liquid and recovering the solid residue.

Casein is an amphoteric compound and thus its isoelectric point (the pH value at which it precipitates) may change as a result of other compounds initially present in the alkaline raw wastewater.

In general, the method comprises the treatment of wastewater by dissolving a quantity of casein in the wastewater. The pH of the wastewater may then adjusted to a preferred value, causing the precipitation of some or substantially all of the dissolved casein. The precipitate is then removed by filtration or a similar method and the wastewater is then discarded or further treated.

There are many operating variables in such a process. The inventors have determined that certain variables have a greater impact on the efficiency of the process than others and that each such variable may be optimized through a treatability trial process. The optimization process utilizes a process of repeated treatability trials to determine the value of the variable which produces the optimal results (dependent variables). In a preferred embodiment, the operating variables include, but are not limited to, the following:

Reactions:
—pH;
—temperature;
—reaction time.

Reagents:
—polymer dosage;
—polymer form or quality;
—pH-adjusting product.
Wastewater:
—type;
—polluting load;
—molecular weight of pollutants.
Reactor:
—volume;
—form;
—agitation;
—recirculation rate.
Clarification:
—sedimentation;
—flotation;
—filtration.

In a particularly preferred embodiment, the following five operating variables are manipulated and optimized in the treatment process:

pH;

temperature;

reaction time;

polymer dosage; and agitation speed.

Results may be monitored to achieve different goals. For example, the following dependent variables may be measured:

Colour—Apparent and True Colour (AC and TC)

Biological Oxygen Demand (BOD)

Chemical Oxygen Demand (COD)

Adsorbable Organic Halides (AOX)

OD . . . Optical Density

DS . . . Dissolved Solids

Resin and Fatty Acids (RFA)

Suspended Solids (SS)

Total Organic Carbon (TOC)

VSS . . . Volatile Suspended Solids

TVSS . . . Total Volatile Suspended Solids

Toxicity

Other variables known in the art may be measured to determine the effectiveness of the treatment process. In a preferred embodiment, the measurement of colour, BOD, COD and SS are emphasized. The methods of determining or measuring the dependent variables (results) are well known in the art.

The effect of the operating variables, or independent variables, on the dependent variables is analyzed using statistical methods or experimental designs, such as the Box-Wilson design or Central Composite Design (CCD). These methods or designs are well-known in the art and reference may be had to "Process Analysis by Statistical Methods", Himedblow 1970, John Wiley & Sons, Inc., the contents of which are incorporated herein by reference. Using these experimental designs, the operating variables may be chosen or set to maximize certain results or to tailor the process to the specific characteristics of the effluent that is to be treated. For example, if the desired result is maximum colour reduction, the operating variables may be optimized by determining the set of conditions necessary to achieve optimum results and adjusting the process parameters to achieve the desired result. In another example, if the effluent to be treated has relatively high SS and low colour, again the operating variables may optimized using the analytical techniques in a series of treatability tests and then applied to the effluent.

In a full factorial design, the experimenter chooses a fixed number of levels for each of the dependent variables and then performs runs or experiments with all the possible combinations. Experimental designs for studying k variables (factors) in n observations (runs or number of combinations), with each factor at x levels, are called x-level factorial designs. In such designs, the observations are not analyzed separately, but are analyzed as an experimental entity or unit, to produce statements independent of the effects of each factor under study. For an x-level factorial design, the number of runs (tests) or observations n is related to the number of variables k by the equation (1).

$$n = x^k \quad (1)$$

Factorial designs are important and have several advantages. They can be supplemented to form composite designs. They are also the basis of fractional (i.e., fractional factorial) designs, which are very useful when the number of variables to be studied is large. These designs and the corresponding fractional designs are used as a set of blocks, in such a way that the degree of complexity of the design constructed matches the degree of complexity of the problem under study. Interpretation of the results, however, is relatively simple.

In a factorial design $x^k$, the higher the number of factors k, the higher the number of interactions or tests. In the case of interest to us, the number of variables is 5, while each variable has 5 levels. For a 5-variable, 5-level factorial design, the number of tests (n) to be performed would be the following:

$$n=x^k \quad (1)$$
$$n=5^5$$
$$n=3,125.$$

The use of an experimental design based on a full factorial design therefore requires that 3,125 tests be performed. Supposing that the tests are to be performed in triplicate (i.e., 9,375 tests) and that the process is to be modelled on several occasions, the number of tests to be performed would thus be astronomical. It would then be an onerous task to perform this number of tests, and very difficult to interpret the results and to discriminate between the separate and combined effects of each of the independent variables on the dependent variables.

Given this unrealistic scenario, it was decided to use a CCD. In a CCD, a certain number of tests come from a factorial design with two levels (factorial points). A factorial design $2^5$ would require the following number of tests:

$$n=x^k \quad (1)$$
$$n=2^5$$
$$n=32.$$

The number of tests to be performed still seemed large to us, considering our intent to perform the tests in triplicate (i.e., 96 tests) and to model the process on several different occasions. As well, these tests concern only the factorial portion of the CCD. There are also the central and axial points or tests to be added to the factorial tests to complete the CCD.

To reduce the number of tests to be performed, a 2-level fractional factorial design may be used for the factorial portion of the CCD. The main effects will then be matched with the interactions or confounded with some interactions. The fractional factorial design used in this CCD is a $2^{5-1}$ design. Thus, the number of tests or factorial points in this experimental design is the following:

$$n=x^k \quad (1)$$
$$n=2^{5-1}$$
$$n=16.$$

In FIG. 1, the factorial points are the points of the cube and are represented by the values 1 and −1. FIG. 1 depicts a 3 factor-5 level CCD and not the 5 factor−5 level CCD which is described below. It is very difficult to graphically represent a 5 factor −5 level CCD.

In a $2^{5-1}$ design, the main effects A, B, C, D and E are thus obtained separately. The "linear" or "main" effects are confounded with the "four-way" interactions. The "two-way" interactions remain grouped in pairs and are confounded with the "three-way" interactions. It is generally agreed that 3-way and higher interactions can be set at zero in advance. The hypothesis submitted is that interaction ABCD is null and that this null interaction is equal to the desired information concerning factor E. E is then equivalent to ABCD. Making ABCD equivalent to E is called aliasing and is represented by:

$$E = ABCD$$

The measurement of effects is equivalent, but not necessarily equal. The variable E=ABCD is called a design generator (i.e., generator of the $2^{5-1}$ fractional factorial design).

As for the defining relation of the 25-1 fractional factorial design used in this experimental CCD, it is expressed as follows:

$$I = ABCDE$$

The aliasing patterns for the $2^{5-1}$ fractional factorial design used in this experimental CCD are the following:

| A = BCDE | AB = CDE |
|---|---|
| B = ACDE | AC = BDE |
| C = ABDE | AD = BCE |
| D = ABCE | AE = BCD |
| E = ABCD | BC = ADE |
| | BD = ACE |
| | BE = ACD |
| | CD = ABE |
| | CE = ABD |
| | DE = ABC |

In short, in the experimental design used (i.e., $2^{5-1}$ fractional factorial design), the generator E=ABCD, or in an equivalent manner I=ABCDE, produced the design's aliasing patterns.

In one embodiment, the method incorporates a resolution V ($R_V$) design. This resolution type makes it possible to determine whether there are significant 2-way or 3-way interaction effects. In the chemical kinetics, temperature, pH, HRT, polymer dosage or agitation speed can have synergistic or antagonistic actions.

The $2^{5-1}$ fractional factorial design used in the experimental design has a resolution of V (i.e., $R_V$ design). It should be noted that main effect A and 4-way interaction (BCDE) are aliased, as are two-way interaction (AB) and three-way interaction (CDE). Thus, main effects are aliased with four-way interactions (4 factors), and two-way interactions (2 factors) are aliased with three-way interactions (3 factors). In general, a design of resolution R is one in which no effect having p factors is confounded with an effect having fewer than (R−p) factors. The design notation is $2_V^{5-1}$.

Generally speaking, the following statements apply:

A design of resolution $R_V$ is an unsaturated design that does not alias main effects with each other or with 2-way interactions. As well, 2-way interactions are not aliased with one another. It alias 2-way interactions with 3-way interactions (e.g., AB=CDE). $R_V$ designs are excellent tools for building prediction equations.

A design of resolution $R_{IV}$ is an unsaturated design that does not alias main effects with each other and with 2-way interactions. It does, however, alias 2-way interactions with other 2-way interactions (e.g., AB=CD). $R_{IV}$ designs are used for building prediction equations when resources are limited and do not allow the use of an $R_V$ design. The knowledge acquired must be used to determine which of the aliased effects is to be included in the prediction equation.

A design of resolution $R_{III}$ is a saturated design that does not alias main effects with one another but does alias main effects with 2-way interactions (e.g., A=BC). $R_{III}$ designs are typically used when screening a large number of factors to find only the most important factors for future experimentation.

A design of resolution $R_{II}$ is a supersaturated design that alias main effects with each other (e.g., A=B) (Schmidt & Launsby 1992).

EXAMPLE

The following example is illustrative but not limiting of the claimed invention.

Wastewaters from a CTMP process were treated in accordance with an embodiment of the present invention. The principal characteristics of the wastewaters treated are shown in Table 1 below:

TABLE 1

Principal characteristics of the wastewaters treated.

| PARAMETER* | MAXIMUM VALUE (mg/L) | MINIMUM VALUE (mg/L) |
|---|---|---|
| COLOUR (±0.8%) | | |
| Apparent | 86,000 ± 700 | 590 ± 5 |
| True | 3,200 ± 26 | 900 ± 7 |
| COD (±0.2%) | | |
| Total | 45,000 ± 90 | 250 ± 0.5 |
| Soluble | 8,600 ± 17 | 690 ± 1 |
| BOD$_5$ (±4%) | | |
| Total | 22,700 ± 908 | 250 ± 10 |
| Soluble | 1,500 ± 60 | 220 ± 9 |
| SOLIDS (±0.1%) | | |
| TS | 19,900 ± 20 | 1,035 ± 1 |
| TVS | 3,450 ± 3 | 525 ± 0.5 |
| SS | 11,600 ± 12 | 30 ± 0.03 |

TABLE 1-continued

Principal characteristics of the wastewaters treated.

| PARAMETER* | MAXIMUM VALUE (mg/L) | MINIMUM VALUE (mg/L) |
|---|---|---|
| VSS | 1,600 ± 2 | 156 ± 0.2 |
| TOC (±2%) | 5,100 ± 100 | 1,550 ± 31 |
| RFA | 104 | 7 |
| AOX (±2%) | 100 ± 2 | 13 ± 0.3 |
| TOXICITY | EC$_{50}$ = 0.5% | — |

—: Not measured

The polymer used was sodium caseinate (refined casein, food grade, from the cheese industry or dairy-produce). The operating variables chosen for analysis are those shown in the following Table 2. Also shown are upper and lower limits chosen for each variable.

TABLE 2

Lower and upper limits used for the principal independent variables.

| VARIABLES | LOWER LIMIT | UPPER LIMIT |
|---|---|---|
| Temperature (° C.) | 5.0 | 40.0 |
| PH | 2.0 | 4.0 |
| HRT (min) | 1.0 | 5.0 |
| Concentration (mg/L) | 0.05 | 1.00 |
| Agitation speed (RPM) | 100 | 1,200 |

HRT = hydraulic retention time.
RPM = revolutions per minute.

The value α used in calculating the value of axial points in the CCD was calculated using the formula shown below (2). This formula uses mainly the fourth root of the number of tests in the factorial portion of the design ($n_f$).

$$\alpha = (n_f)^{1/4} \quad (2)$$

In the experimental design used, the number of tests in the factorial portion of the design is 16, therefore value α is:

$$\alpha = (n_f)^{1/4} \quad (2A)$$
$$\alpha = (16)^{1/4}$$
$$\alpha = 2$$

The value used for calculating the actual values of the axial points or star points in this CCD will therefore be 2. The value of a is generally chosen in such a way as to produce rotatability of the design. This implies that the predicted response can be estimated with an equal variance regardless of the direction from the centre of the design space. Rotatability is a valuable statistical property for an experimental design to have, but it is not essential. For rotatability, the value of α must be greater than 1, in such a way that the minimum and maximum factor is ±1. An easy way to resolve the transformation is to code the experimental levels as follows:

−α −1 0 1 α

The number of axial points or star points ($n_a$) is normally equal to twice the number of independent variables or factors (k) incorporated into the design. In the present design, the number of independent variables is 5. The number of axial points or star points is therefore:

$$n_a = 2k \quad (3)$$
$$n_a = 2(5)$$
$$n_a = 10.$$

Thus, the number of axial points or star points incorporated into the present experimental design will be 10. The axial points are represented by the points of an imaginary star emerging from the factorial cube. The axial points are represented in FIG. 1 by the coded values α and −α.

The central points are represented in the experimental design by the number 0 as shown in FIG. 1. The theoretical or suggested number of central points to be included in an experimental design is estimated on the basis of the following formula:

$$n_c = 4\sqrt{(n_f+1)} - 2k \quad (4)$$

where $n_c$ is the number of central points, $n_f$ the number of factorial points in the design, and k the number of independent variables or factors incorporated into the design.

In one embodiment, the number of factorial points is 16, while the number of independent variables is 5. The number of central points is therefore the following:

$$n_c = 4\sqrt{(n_f+1)} - 2k \quad (4)$$

$$n_c = 4\sqrt{(16+1)} - 2(5)$$

$$n_c = 4(4.123) - 10$$

$$n_c = 6.49 \sim 7.$$

Thus, the number of central points incorporated into the present experimental design will be 7.

The experimental design used to perform the tests is a 5-level CCD relating to five independent or operating variables. The total number of runs or tests ($n_t$) to be performed is the sum of the number of axial ($n_a$), central ($n_c$) and factorial ($n_f$) tests or points.

$$n_t = n_a + n_c + n_f \quad (5)$$

$$n_t = 10 + 7 + 16$$

$$n_t = 33$$

Coded Design Matrix

The coded matrix of the experimental design (i.e., 5-variable, 5-level CCD) used in the series of treatability trials is shown in Table 3.

The independent variables or factors used in the present design are temperature (T°), pH, hydraulic retention time (HRT), polymer concentration (CONC.) and agitation speed (AS). Runs 1 to 16 represent the factorial points, runs 17 to 23 the central points, and runs 24 to 33 the axial points of the present design.

The calculations performed to determine the experimental or actual values of the independent variables for each of the levels used in the present example are shown below. The actual matrix of the design used is shown at the end of this section (Table 4). Let us now define the five experimental levels used in the said matrix.

As stated earlier, the coded values of the five experimental or treatment levels for a given independent variable are represented as follows:

−α −1 0 1 α.

The axial points have codes −α and α, the central points code 0, and the factorial points codes −1 and 1. The minimal and maximal values were determined for independent variables or operating conditions. These values of the axial points represent the range of interest of the selected independent variables.

TABLE 3

Coded Matrix of the CCD.

| TEST | T° | pH | HRT | CONC. | AS |
|---|---|---|---|---|---|
| 1 | 1 | 1 | 1 | 1 | 1 |
| 2 | 1 | 1 | 1 | −1 | −1 |
| 3 | 1 | 1 | −1 | 1 | −1 |
| 4 | 1 | 1 | −1 | −1 | 1 |
| 5 | 1 | −1 | 1 | 1 | −1 |
| 6 | 1 | −1 | 1 | −1 | 1 |
| 7 | 1 | −1 | −1 | 1 | 1 |
| 8 | 1 | −1 | −1 | −1 | −1 |
| 9 | −1 | 1 | 1 | 1 | −1 |
| 10 | −1 | 1 | 1 | −1 | 1 |
| 11 | −1 | 1 | −1 | 1 | 1 |
| 12 | −1 | 1 | −1 | −1 | −1 |
| 13 | −1 | −1 | 1 | 1 | 1 |
| 14 | −1 | −1 | 1 | −1 | −1 |
| 15 | −1 | −1 | −1 | 1 | −1 |
| 16 | −1 | −1 | −1 | −1 | 1 |
| 17 | 0 | 0 | 0 | 0 | 0 |
| 18 | 0 | 0 | 0 | 0 | 0 |
| 19 | 0 | 0 | 0 | 0 | 0 |
| 20 | 0 | 0 | 0 | 0 | 0 |
| 21 | 0 | 0 | 0 | 0 | 0 |
| 22 | 0 | 0 | 0 | 0 | 0 |
| 23 | 0 | 0 | 0 | 0 | 0 |
| 24 | −α | 0 | 0 | 0 | 0 |
| 25 | α | 0 | 0 | 0 | 0 |
| 26 | 0 | −α | 0 | 0 | 0 |
| 27 | 0 | α | 0 | 0 | 0 |
| 28 | 0 | 0 | −α | 0 | 0 |
| 29 | 0 | 0 | α | 0 | 0 |
| 30 | 0 | 0 | 0 | −α | 0 |
| 31 | 0 | 0 | 0 | α | 0 |
| 32 | 0 | 0 | 0 | 0 | −α |
| 33 | 0 | 0 | 0 | 0 | α |

Real Design Matrix

This section describes and shows all the calculations performed to determine the real factor values or values of the independent variables for each of the levels used in the present experimental design. The real matrix of the design used is shown at the end of this section (Table 4). Let us now define the five experimental levels used in the said matrix.

As stated earlier, the coded values of the five experimental levels for a given independent variable are represented as follows:

−α −1 0 1 α.

Bear in mind that, in the experimental design, the axial points have codes −α and α, the central points code 0, and the factorial points codes −1 and 1. The values of the axial points were determined when the decision as to the range of interest of the selected independent variables or operating conditions was made. Thus, these values are the specific upper and lower limits chosen for this example, for each of the independent variables.

The value of the central points (vcp) is obtained simply by dividing the sum of the axial points or of the upper and lower limits by two. This can be expressed in the form of the following equation:

$$vcp = \frac{-\alpha + \alpha}{2} = \frac{upper\ lim. + lower\ lim.}{2} \quad (6)$$

Given the values of the central points or the upper and lower limits used in the present design, the specific values of the central points for each of the independent variables are the following:

| Temperature | (5 + 40)/2 | = | 22.5° C. |
|---|---|---|---|
| pH | (2 + 4)/2 | = | 3.0 |
| HRT | (1 + 5)/2 | = | 3.0 minutes |
| Concentration | (0.05 + 1.0)/2 | = | 0.525 mg/L |
| AS | (100 + 1,200)/2 | = | 650 RPM |

For a given independent variable, the value of the factorial points (−1 & 1) is obtained by adding to or subtracting from the value of the central point the value of Δ. The equation used to calculate the value of the factorial points (vfp) is the following:

$$vfp = vcp \pm \Delta \quad (7)$$

For a given variable, the value of Δ is obtained simply by subtracting the value of the central point from the value of the upper axial point (vap), then dividing this difference by the value of α. This may be expressed in the form of the following equation:

$$\Delta = \frac{vap - vcp}{\alpha} \quad (8)$$

With a view to keeping the "modelling" section integrated, calculation examples are included in the present section. Given the specific values of the central point and the upper axial point, and value α calculated by means of equation 2, the specific values of Δ are the following:

$T°$     $\Delta T° = \dfrac{vap - vcp}{\alpha}$ $\Delta T° = \dfrac{40.0 - 22.5}{2}$ $\Delta T° = 8.75$ pH     $\Delta pH = \dfrac{vap - vcp}{\alpha}$ $\Delta pH = \dfrac{4 - 3}{2}$ $\Delta pH = 0.5$ HRT     $\Delta HRT = \dfrac{vap - vcp}{\alpha}$ $\Delta HRT = \dfrac{5 - 3}{2}$ $\Delta HRT = 1.0$ CONC     $\Delta CONC = \dfrac{vap - vcp}{\alpha}$ $\Delta CONC = \dfrac{1.0 - 0.525}{2}$ $\Delta CONC = 0.2375$ AS     $\Delta AS = \dfrac{vap - vcp}{\alpha}$ $\Delta AS = \dfrac{1200 - 650}{2}$ $\Delta AS = 275$ By substituting the specific values of Δ in equation 7, we obtain the real value of the factorial points (−1 and 1) for each of the independent variables. Thus, we proceed as follows:

$T°$     $vfp = vcp \pm \Delta$ $vfp = 22.5 \pm 8.75$ $vfp = 13.75 \ \& \ 31.25° C$.

pH     $vfp = vcp \pm \Delta$ $vfp = 3 \pm 0.5$ $vfp = 2.5 \ \& \ 3.5$

HRT     $vfp = vcp \pm \Delta$ $vfp = 3 \pm 1$ $vfp = 2 \ \& \ 4$ minutes

CONC.     $vfp = vcp \pm \Delta$ $vfp = 0.525 \pm 0.2375$ $vfp = 0.2875 \ \& \ 0.7625$ mg/L AS     $vfp = vcp \pm \Delta$ $vfp = 650 \pm 275$ $vfp = 375 \ \& \ 925$ RPM

Summary

In short, the calculations performed to obtain the real values of the independent variables at each of the five levels of the present design are the following:

| −α | −1 | 0 | 1 | α |
|---|---|---|---|---|
| *Temperature (T°)* | | | | |
| 5 | (22.5 − Δ) | 22.5 | (22.5 + Δ) | 40 |
| 5 | (22.5 − 8.75) | 22.5 | (22.5 + 8.75) | 40 |
| 5 | 13.75 | 22.5 | 31.25 | 40 |
| *pH* | | | | |
| 2 | (3 − Δ) | 3 | (3 + Δ) | 4 |
| 2 | (3 − 0.50) | 3 | (3 + 0.5) | 4 |
| 2 | 2.5 | 3 | 3.5 | 4 |
| *Hydraulic Retention Time (HRT)* | | | | |
| 1 | (3 − Δ) | 3 | (3 + Δ) | 5 |
| 1 | (3 − 1) | 3 | (3 + 1) | 5 |
| 1 | 2 | 3 | 4 | 5 |
| *Concentration (CONC.)* | | | | |
| 0.05 | (0.525 − Δ) | 0.525 | (0.525 + Δ) | 1.0 |
| 0.05 | (0.525 − 0.2375) | 0.525 | (0.525 + 0.2375) | 1.0 |
| 0.05 | 0.2875 | 0.525 | 0.7625 | 1.0 |
| *Agitation Speed (AS)* | | | | |
| 100 | (650 − Δ) | 650 | (650 + Δ) | 1,200 |
| 100 | (650 − 275) | 650 | (650 + 275) | 1,200 |
| 100 | 375 | 650 | 875 | 1,200 |

The real matrix of the experimental design (i.e., 5-variable, 5-level CCD) that will be used in performing the series of experimental runs is shown in Table 4.

TABLE 4

Real Matrix of the CCD.

| RUN | T° | pH | HRT | CONC. | AS |
|---|---|---|---|---|---|
| 1 | 31.25 | 3.5 | 4 | 0.7625 | 925 |
| 2 | 31.25 | 3.5 | 4 | 0.2875 | 375 |

TABLE 4-continued

Real Matrix of the CCD.

| RUN | T° | pH | HRT | CONC. | AS |
|---|---|---|---|---|---|
| 3 | 31.25 | 3.5 | 2 | 0.7625 | 375 |
| 4 | 31.25 | 3.5 | 2 | 0.2875 | 925 |
| 5 | 31.25 | 2.5 | 4 | 0.7625 | 375 |
| 6 | 31.25 | 2.5 | 4 | 0.2875 | 925 |
| 7 | 31.25 | 2.5 | 2 | 0.7625 | 925 |
| 8 | 31.25 | 2.5 | 2 | 0.2875 | 375 |
| 9 | 13.75 | 3.5 | 4 | 0.7625 | 375 |
| 10 | 13.75 | 3.5 | 4 | 0.2875 | 925 |
| 11 | 13.75 | 3.5 | 2 | 0.7625 | 925 |
| 12 | 13.75 | 3.5 | 2 | 0.2875 | 375 |
| 13 | 13.75 | 2.5 | 4 | 0.7625 | 925 |
| 14 | 13.75 | 2.5 | 4 | 0.2875 | 375 |
| 15 | 13.75 | 2.5 | 2 | 0.7625 | 375 |
| 16 | 13.75 | 2.5 | 2 | 0.2875 | 925 |
| 17 | 22.50 | 3.0 | 3 | 0.5250 | 650 |
| 18 | 22.50 | 3.0 | 3 | 0.5250 | 650 |
| 19 | 22.50 | 3.0 | 3 | 0.5250 | 650 |
| 20 | 22.50 | 3.0 | 3 | 0.5250 | 650 |
| 21 | 22.50 | 3.0 | 3 | 0.5250 | 650 |
| 22 | 22.50 | 3.0 | 3 | 0.5250 | 650 |
| 23 | 22.50 | 3.0 | 3 | 0.5250 | 650 |
| 24 | 5.00 | 3.0 | 3 | 0.5250 | 650 |
| 25 | 40.00 | 3.0 | 3 | 0.5250 | 650 |
| 26 | 22.50 | 2.0 | 3 | 0.5250 | 650 |
| 27 | 22.50 | 4.0 | 3 | 0.5250 | 650 |
| 28 | 22.50 | 3.0 | 1 | 0.5250 | 650 |
| 29 | 22.50 | 3.0 | 5 | 0.5250 | 650 |
| 30 | 22.50 | 3.0 | 3 | 0.0500 | 650 |
| 31 | 22.50 | 3.0 | 3 | 1.0000 | 650 |
| 32 | 22.50 | 3.0 | 3 | 0.5250 | 100 |
| 33 | 22.50 | 3.0 | 3 | 0.5250 | 1,200 |

Results

TABLE 5

Best performances obtained during treatment of various pulp and paper mill wastewaters.

| PARAMETER | REDUCTION (%) |
|---|---|
| AC, TC | >99 |
| SS, VSS | >99 |
| RFA | 99 |
| TOTAL COD | 88 |
| TS | 83 |
| SOLUBLE COD | 82 |
| AOX | 68 |
| TOTAL BOD$_5$ | 67 |
| TVS | 60 |
| TOC | 50 |
| SOLUBLE BOD$_5$ | 45 |
| DS | 45 |
| MICROTOX TOXICITY | >100 |

COD Reduction

Compilation of the results of the modelling study shows that the results obtained are reproducible (Table 6). According to this study, the best treatment performances, in terms of reduction in total COD, vary between 57 and 68%, while in the case of soluble COD, they fluctuate between 30 and 40%. Given the variability in wastewater characteristics and the preliminary nature of some modelling studies, the best performances obtained through the various studies or tests are comparable and reproducible.

The best total and soluble COD reduction efficiencies are generally obtained under the same experimental conditions. The conditions optimizing COD reduction are generally a temperature of 13.8° C., a pH of 2.5, a reaction time of 4 minutes, a polymer concentration of 0.7625 g/L and an agitation speed of 925 RPM.

Colour Reduction

The best treatment performances in reducing the colour of wastewaters are reductions in AC equal to or greater than 99% and reductions in TC of 95 to 98% (Table 6). Thus they demonstrate that the results obtained are reproducible.

Optimal performances in terms of colour and COD reduction are generally obtained under identical experimental conditions. The optimal conditions are a temperature of 13.8° C., a pH of 2.4, a reaction time of 4 minutes, a polymer concentration of 0.7625 g/L and an agitation speed of 925 RPM.

TABLE 6

Best performances and optimal conditions for treatment of CTMP wastewaters.

| | | | EXPERIMENTAL CONDITIONS | | | | |
|---|---|---|---|---|---|---|---|
| VARIABLE | STUDY (#) | BEST PERFORMANCE | TEMPERA- TURE (° C.) | pH | REACTION TIME (Minutes) | POLYMER CONCENTRA- TION (g/L) | AGITATION SPEED (RPM) |
| Total COD | 1 | 60 | 13.8 | 2.5 | 4 | 0.7625 | 925 |
| | 2 | 67 | 22.5 | 3.0 | 3 | 0.5250 | 1,200 |
| | 3 | 63 | 13.8 | 2.5 | 4 | 0.7655 | 925 |
| | 4 | 62 | 13.8 | 2.5 | 4 | 0.7625 | 925 |
| | 5 | 68 | 13.8 | 2.5 | 4 | 0.7625 | 925 |
| | 6 | 57 | 13.8 | 2.5 | 4 | 0.7625 | 925 |
| Soluble COD | 2 | 36 | 22.5 | 3.0 | 3 | 0.5250 | 1,200 |
| | 3 | 31 | 13.8 | 2.5 | 4 | 0.7625 | 925 |
| | 4 | 40 | 13.8 | 2.5 | 4 | 0.7625 | 925 |
| | 5 | 30 | 13.8 | 2.5 | 4 | 0.7625 | 925 |
| | 6 | 31 | 13.8 | 2.5 | 4 | 0.7625 | 925 |
| AC | 3 | 99 | 13.8 | 2.5 | 4 | 0.7625 | 925 |
| | 4 | >99 | 13.8 | 2.5 | 4 | 0.7625 | 925 |

TABLE 6-continued

Best performances and optimal conditions for treatment of CTMP wastewaters.

| | | | EXPERIMENTAL CONDITIONS | | | | |
|---|---|---|---|---|---|---|---|
| VARIABLE | STUDY (#) | BEST PERFORMANCE | TEMPERA-TURE (° C.) | pH | REACTION TIME (Minutes) | POLYMER CONCENTRA-TION (g/L) | AGITATION SPEED (RPM) |
| | 5 | 99 | 13.8 | 2.5 | 4 | 0.7625 | 925 |
| | 6 | 99 | 13.8 | 2.5 | 4 | 0.7625 | 925 |
| TC | 4 | 98 | 13.8 | 2.5 | 4 | 0.7625 | 925 |
| | 5 | 95 | 13.8 | 2.5 | 4 | 0.7625 | 925 |
| | 6 | 96 | 13.8 | 2.5 | 4 | 0.7625 | 925 |
| TS | 1 | 33 | 13.8 | 3.5 | 2 | 0.2875 | 375 |
| | 3 | 34 | 22.5 | 3.0 | 1 | 0.5250 | 650 |
| | 4 | 39 | 13.8 | 3.5 | 2 | 0.7625 | 925 |
| | 6 | 23 | 13.8 | 2.5 | 4 | 0.7625 | 925 |
| TVS | 4 | 59 | 5.0 | 3.0 | 3 | 0.5250 | 650 |
| | 6 | 23 | 13.8 | 3.5 | 2 | 0.7625 | 925 |
| SS | 4 | 94 | 22.5 | 3.0 | 3 | 0.5250 | 650 |
| | 6 | >99 | 13.8; 22.5; 31.1 | 2.0 to 4.0 | 1 to 5 | 0.7525; 0.525; 1.0 | 100 to 925 |
| VSS | 4 | 98 | 31.25 | 2.5 | 2 | 0.7625 | 650 |
| | 6 | >99 | 22.5 | 2.0; 3.0; 4.0 | 1, 3, 5 | 0.5250; 1.0 | 925 |
| TOC | 4 | 47 | 13.8 | 3.5 | 4 | 0.7625 | 375 |
| | 6 | 44 | 13.8 | 2.5 | 4 | 0.7625 | 925 |
| Total $BOD_5$ | 4 | 50 | 13.8 | 2.5 | 4 | 0.2875 | 375 |
| | 6 | 52 | 22.5 | 2.0 | 3 | 0.5250 | 650 |
| Soluble $BOD_5$ | 4 | 33 | 13.8 | 2.5 | 2 | 0.2875 | 925 |
| SLUDGES | 5 | 1.200* | 31.2 | 2.5 | 2 | 0.7625 | 925 |
| | 6 | 1.523* | 31.2 | 2.5 | 2 | 0.7625 | 925 |
| RFA | 4 | 97 | 13.8 | 3.5 | 2 | 0.7625 | 925 |
| RA | 4 | 99 | 13.8 | 3.5 | 2 | 0.7625 | 925 |
| FA | 4 | 85 | 13.8 | 3.5 | 2 | 0.7625 | 925 |

*: Average maximum production of chemical sludges

Solids Reduction

Table 6 shows a greater variability in the best rates of reduction in the TS and TVS content of the wastewaters. Thus, the best performances are reductions of 23 to 39% in TS content and 23 to 59% in TVS content. The best reductions obtained in the SS content (94 to >99%) and VSS content (98 to >99%) of the wastewaters during the various studies are comparable or close to each other. Thus the results obtained in terms of reduction in SS and VSS content generally have a higher level of reproducibility than those expressed in terms of reduction in TS and TVS content.

As was the case for COD and colour, the best reduction efficiencies for TS and TVS content are generally obtained under a temperature of 13.8° C., a pH of 2.5, a reaction time of 4 minutes, a polymer concentration of 0.7625 g/L and an agitation speed of 925 RPM. The range of experimental conditions under which the best efficiencies in reducing the SS and VSS content of the wastewaters are obtained is greater. However, it generally includes the conditions under which the best reductions in COD, colour and TS and TVS content are obtained.

TOC Reduction

The maximum efficiencies of the treatment in reducing the TOC content of the wastewaters are close to each other and reproducible. Thus it was possible to obtain, during the modelling tests, optimal reductions of 44 to 47% in the TOC content of the wastewaters. These maximum efficiencies are achieved under the same conditions that make it possible to obtain optimal reductions in COD, colour and the solids content of the wastewaters.

$BOD_5$ Reduction

Modelling of the efficiency of the treatment in reducing the $BOD_5$ of the wastewaters is more problematic. In some cases, the modelling study of this dependent variable did not allow building of a prediction equation with a significance or confidence level equal to or greater than 95%. Thus the statistical significance of the relative importance of the independent variables or their effect on the reduction in $BOD_5$ of the wastewaters was less than 95%.

The only two prediction equations allowing us to model the reduction in total $BOD_5$ of the wastewaters in a significant way suggest that the results obtained would be at the limit of their reproducibility. Thus the optimal efficiencies were reductions of 50 and 52% in total $BOD_5$.

As for the experimental conditions under which the best performances are obtained, they are comparable or close to those generally allowing optimization of the reduction in the other dependent variables under study.

Sludge Production

The modelling study of the quantity of chemical sludges produced during treatment of the CTMP wastewaters under study shows that the maximum quantities of sludge produced are 1.200 and 1.523 g/L (grams of sludges produced per litre of wastewaters treated). These results are difficult to interpret, however, as they are mainly a function of the polluting load of the wastewaters under study and the efficiency of the treatment. Thus, the variability in the quantity of chemical sludges produced is a function of these last two parameters.

RFA Reduction

The optimal performances of the treatment in reducing the RFA content of the wastewaters are reductions of 97% in RFA, 99% in RA and 85% in FA. These performances were obtained under experimental conditions comparable to or close to those that generally make it possible to optimize the reduction of all the dependent variables under study.

Summary

In the present example the conditions making it possible to optimize treatment of the CTMP wastewaters are a temperature of 13.8° C., a pH of 2.5, a reaction time of 4 minutes, a polymer concentration of 0.7625 g/L and an agitation speed of 925 RPM. This combination of operating variables optimized the reduction of most of the dependent variables examined.

As will be apparent to those skilled in the art, various modifications, adaptations and variations of the foregoing specific disclosure can be made without departing from the scope of the invention claimed herein.

What is claimed is:

1. A method of removing contaminants from a wastewater stream comprising the steps of:
   (a) obtaining a plurality of wastewater samples from the wastewater stream;
   (b) choosing at least 5 operating variables comprising:
      (i.) concentration of a polymer comprising casein;
      (ii.) pH;
      (iii.) temperature;
      (iv.) hydraulic retention time; and
      (v.) degree of agitation;
   (c) operating a plurality of trials to assess treatment efficiency wherein each trial is operated using a different combination of operating variables from other trials;
   (d) determining an optimum value of each operating variable to achieve optimum contaminant removal from the wastewater stream; and
   (e) treating the wastewater stream with a polymer comprising casein utilizing the optimized values determined in step (d).

2. The method of claim 1 wherein the determination of optimum values is carried by a statistical analysis.

3. The method of claim 2 wherein the statistical analysis comprises the Box-Wilson design.

* * * * *